W. W. KEMP & W. H. VAN HORN.
BLOW-OFF VALVE.
APPLICATION FILED FEB. 17, 1912.

1,087,782.

Patented Feb. 17, 1914.
3 SHEETS—SHEET 1.

Witnesses
H. E. Robinette
J. P. Hollingsworth

Inventors
William W. Kemp
William H. Van Horn
By Meyers, Cushman & Rea
Attorney

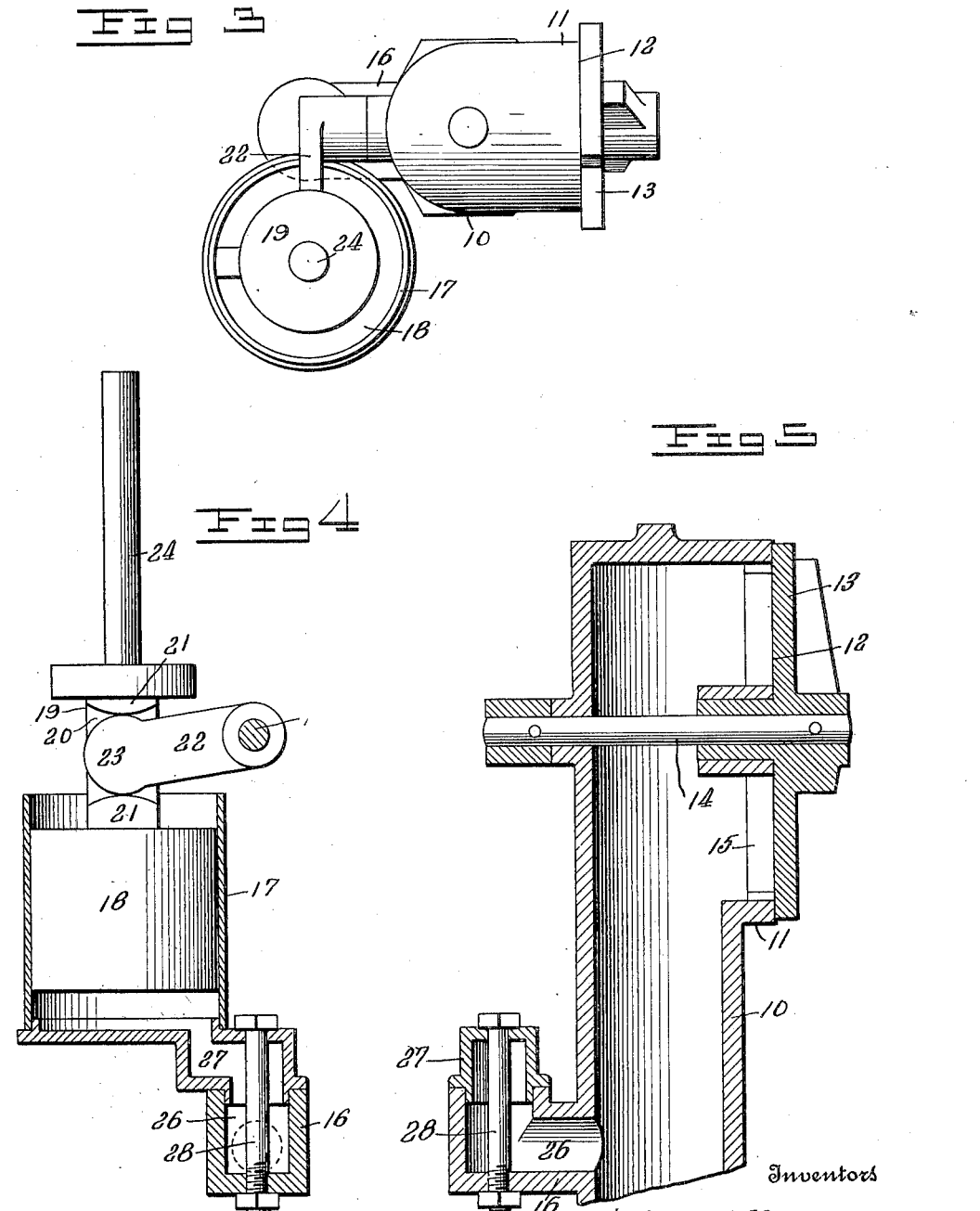

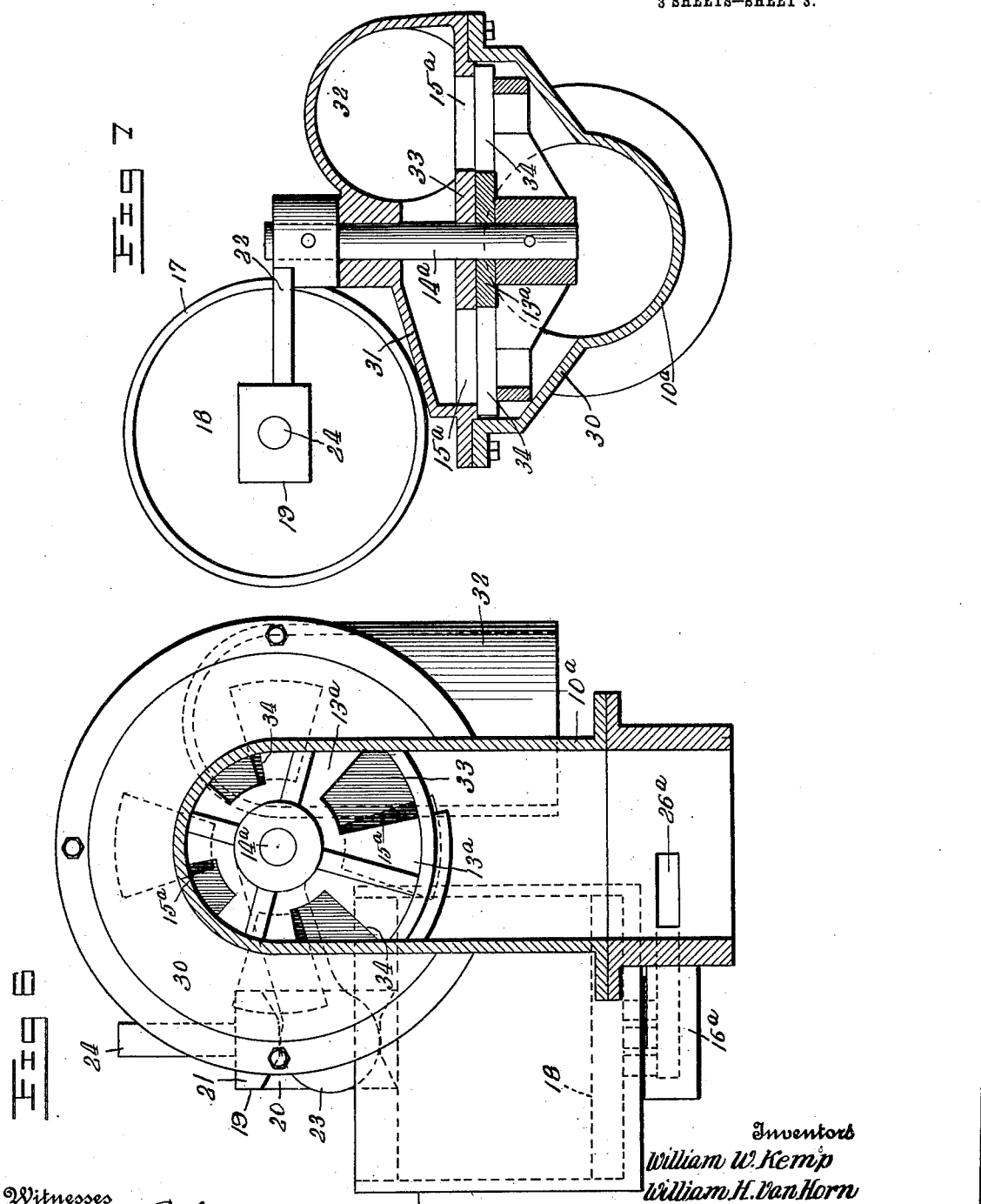

UNITED STATES PATENT OFFICE.

WILLIAM WALLACE KEMP AND WILLIAM H. VAN HORN, OF BALTIMORE, MARYLAND.

BLOW-OFF VALVE.

1,087,782.   Specification of Letters Patent.   Patented Feb. 17, 1914.

Application filed February 17, 1912. Serial No. 678,268.

*To all whom it may concern:*

Be it known that we, WILLIAM W. KEMP and WILLIAM H. VAN HORN, citizens of the United States, residing at Baltimore, in the State of Maryland, have invented new and useful Improvements in Blow-Off Valves, of which the following is a specification.

This invention relates to a blow-off or relief valve designed to maintain a constant pressure of fluid in a pipe or other system having a constant supply and changeable outlet capacities or the reverse thereof, or both a changeable supply and outlet. Numerous devices controlled by spring pressure or gravity have been devised to meet this demand, but, as far as known, none of them have wholly succeeded in meeting the necessary requirements.

In the present invention there is a desired sensitiveness and a quick response to the slightest change in pressure; a simplicity of design and construction; a small number of movable parts which are strong and subjected to little wear, and being wholly exterior the main pipe, flow of fluid through said pipe is not impeded nor lessened in any manner.

The object of the invention, therefore, is to provide a blow-off valve for attachment to the main pipe of a fluid pressure system and in communication with said pipe, which shall be so sensitive to the slightest change in pressure that an outlet for the fluid will be increased or decreased in area proportional to the rise and fall of pressure, whereby a constant pressure is maintained in the system under all circumstances.

With this as the main object in view, the invention consists of the novel construction, combination and arrangement of parts hereinafter described in detail and pointed out in the appended claim, reference being had to the accompanying drawings, in which—

Figure 1:
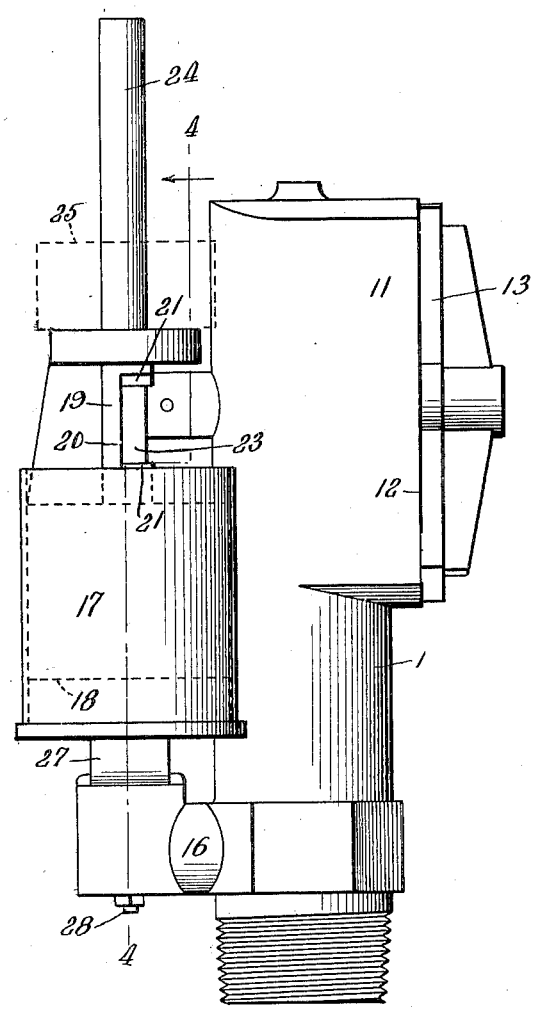
Figure 2:
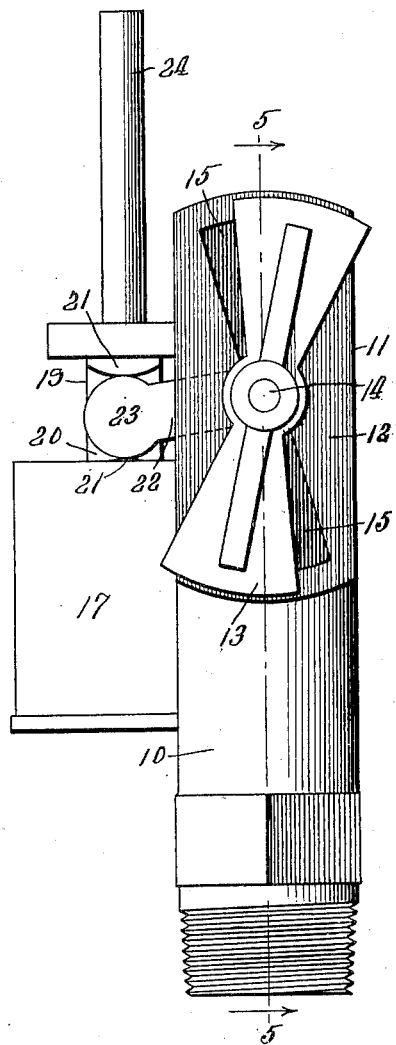

Figure 1 is an elevation of one side of the improved blow-off valve. Fig. 2 is an elevation of the same as viewed from the right side of Fig. 1. Fig. 3 is a plan view of the blow-off valve. Fig. 4 is a sectional view on the line 4—4 of Fig. 1. Fig. 5 is a similar view on the line 5—5 of Fig. 2. Fig. 6 is an elevation partly in section of a blow-off valve designed for a greater volume of fluid than the valve shown in the previous figures, but operating on the same principle. Fig. 7 is a plan view partly in section of the same valve.

In the drawings, 10 designates the upright body portion of the blow-off valve, hollow throughout its length and open at its bottom which is screw threaded or otherwise designed for attachment to a main, or a branch thereof, leading from a pressure apparatus, such as a blower, pump or the like, to various points by means of branch pipes in well known manner. At the top of the body 10 on one side 11 thereof is a flat smooth face 12 against which a valve 13, preferably of butterfly type, fits closely and is reciprocated thereon by a shaft 14 mounted in bearings on the body, as shown. Through the side 11 are formed one or more openings 15 which will be covered by the valve 13 when the pressure in the system is below normal, and uncovered, more or less, should the pressure rise above normal.

Projecting outwardly from the lower end of the body 10 is an arm 16, on the extremity of which is bolted or otherwise fastened a vertical, open topped cylinder 17 within which is a piston 18, a standard 19 rising from the top of said piston. In one side of the standard 19 is a recess 20, the upper and lower sides 21 of which are preferably curved and between which the free end of a lever 22, fast on the shaft 14, projects, said free end 23 being preferably of circular shape and bearing at opposite points against the curved sides 21 of said recess. An upright rod 24 is fastened on the top of the standard 19 to receive weights 25 when such are necessary to adjust the blow-off valve to the desired pressure.

A passageway 26 extends through the arm 16 from the body 10 and opens at its outer end into the bottom of the cylinder through a hollow bracket 27 fastened by a bolt 28 to the arm 16, as shown most clearly in Figs. 4 and 5. If desired the bracket 27 may be dispensed with and the cylinder 17 secured directly on the arm 16, as in Figs. 6 and 7.

In Figs. 6 and 7, the form of the blow-off valve is changed somewhat to adapt it for use with a greater volume of fluid. Here the body 10ª terminates at its upper end in a circular hood 30 the open side of which lies in a vertical plane. Bolted to this open side is a frusto-conical cap 31 having an outlet 32 to which a pipe may be attached for carrying off the exhaust fluid. A plate 33 extends across the mouth of the cap 31 with openings 15ª therein for the passage of fluid into the cap and thence to the outlet.

Within the hood 30 is an oscillating disk valve 13ª arranged to bear against the face of the plate 33, said valve having openings 34 therethrough equal in number to the openings 15ª in the plate 33. A shaft 14ª journaled in the cap 31 carries the valve disk on its inner end and a lever 22 on its outer end for oscillating the valve in the same manner as heretofore described. A hollow arm 16ª extends from the body 10ª to the center of the cylinder 17 and supports the same, the passageway 26ª through said arm opening at its outer end into the bottom of said cylinder.

In operation, a fluid, such as air, enters the body of the blow-off valve from the main of the compressing apparatus and flows into the cylinder below the piston. If the consumption and supply of air at the desired pressure are equal, the piston will remain at the bottom of the cylinder and the valve cover the outlet openings. Should at any time the consumption decrease, the pressure in the main will rise, and acting on the piston 18 will raise it and through the connections described, cause the valve to turn and uncover the openings sufficiently far to permit the escape of enough air to compensate for the lesser amount used. A slight increase in use lessens the air pressure in the main and the valve body, causing the piston to fall and proportionately close the outlet openings. A decrease in use of a large quantity, or all the air supplied will be quickly responded to by a rise of the piston opening the outlets to a greater or to their full extent as the occasion warrants. When the outlets are fully open, sufficient air escapes therethrough to retain the desired pressure in the system.

What we claim is:

A blow-off valve comprising an upright hollow body threaded upon its lower end for attachment to a fluid pressure pipe, and having a substantially rectangular offset at one side thereof to provide a flat face having outlets therein communicating with said body, a shaft journaled transversely through the body, a valve on the outer end of said shaft movable against said face for opening and closing said outlets, a hollow arm projecting laterally from the body at its lower end, an open topped cylinder secured to said arm, a piston movable in the cylinder and having a standard rising therefrom, a weight on the standard adapted to normally urge the piston down in the cylinder, said standard having a recess therein, the opposed walls of said recess being oppositely curved to provide a cam operating surface, and a lever fast to the rear end of said shaft at one end and engaging at its opposite end in said recess, said lever having a circular head adapted to be acted upon by the cam walls of said recess whereby upon upward movement of the piston by excess pressure in the cylinder, said shaft is turned to open said valve and exhaust the excess pressure from the body.

In testimony whereof we have hereunto set our hands in presence of two subscribing witnesses.

WILLIAM WALLACE KEMP
WILLIAM H. VAN HORN

Witnesses:
 Louis C. Klerlein,
 E. Kramer.